(12) United States Patent
Mitsuda

(10) Patent No.: US 6,580,236 B2
(45) Date of Patent: Jun. 17, 2003

(54) BRUSHLESS MOTOR DRIVE CIRCUIT HAVING LOW NOISE AND HIGH EFFICIENCY

(75) Inventor: Tsuyoshi Mitsuda, Tokyo (JP)

(73) Assignee: NEC Electronics Corporation, Kanagawa (JP)

(*) Notice: Subject to any disclaimer, the term of this patent is extended or adjusted under 35 U.S.C. 154(b) by 0 days.

(21) Appl. No.: 09/971,924

(22) Filed: Oct. 9, 2001

(65) Prior Publication Data

US 2002/0074968 A1 Jun. 20, 2002

(30) Foreign Application Priority Data

Oct. 10, 2000 (JP) ........................................ 2000-308966

(51) Int. Cl.[7] ................................................. H02P 1/18
(52) U.S. Cl. ...................... 318/254; 318/138; 318/439; 318/599; 318/459; 318/500; 388/923; 388/928.1
(58) Field of Search ................................. 318/254, 138, 318/439, 459, 599, 500; 388/923, 928.1

(56) References Cited

U.S. PATENT DOCUMENTS

| | | | |
|---|---|---|---|
| 4,712,050 A | * | 12/1987 | Nagasawa et al. .......... 318/254 |
| 4,743,815 A | * | 5/1988 | Gee et al. ................... 318/254 |
| 5,053,686 A | * | 10/1991 | Juarez ........................ 318/254 |
| 5,640,073 A | * | 6/1997 | Ikeda et al. ................. 318/439 |
| 6,232,730 B1 | * | 5/2001 | Doyama et al. ............. 318/254 |

FOREIGN PATENT DOCUMENTS

JP 11-235079 8/1999

* cited by examiner

Primary Examiner—Robert E. Nappi
Assistant Examiner—Rina I. Duda
(74) Attorney, Agent, or Firm—Whitham, Curtis & Christofferson, PC

(57) ABSTRACT

A motor drive circuit for driving a brushless motor having a rotor and exciting coils of respective phases. A square wave rotor position signal for each phase is produced wherein a half period of the rotor position signal corresponds to a time period from a polarity inversion of an induced voltage of the exciting coil to the next polarity inversion of the induced voltage. Based on the rotor position signal, excitation of the exciting coils is performed by controlling switching elements for conducting excitation currents by using square wave on-control and/or pulse width converted square wave pulse width modulation (PWM) control. A pulse width converted sinusoidal wave PWM signal is generated whose pulse width varies according to a sinusoidal function. Excitation of the exciting coils is controlled based on the pulse width converted sinusoidal wave PWM signal immediately before and after the square wave on-controlled portions and/or the pulse width converted square wave PWM controlled portions.

18 Claims, 9 Drawing Sheets

FIG. 2A (EXCITING COIL ENERGIZING TIMING)
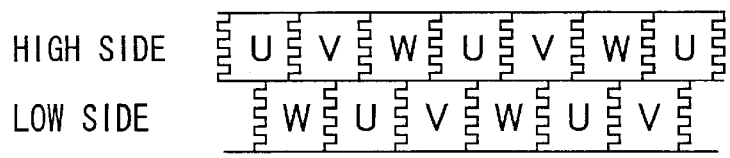
FIG. 2B (TRANSISTOR CONTROL TIMING)
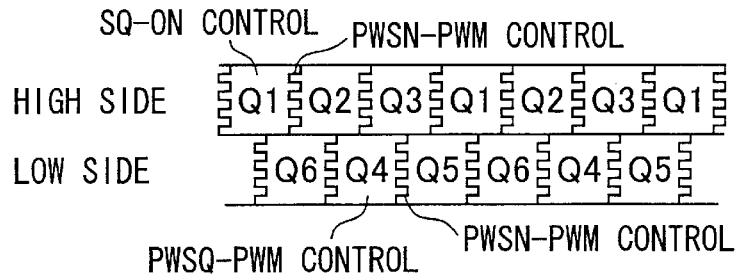
FIG. 2C (DETECTED SIGNAL)
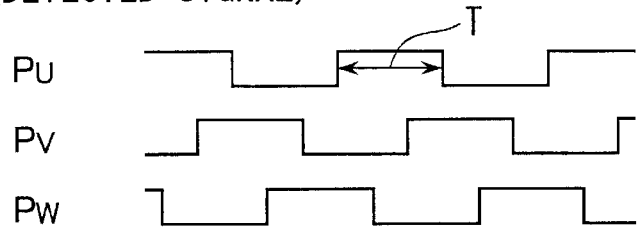
FIG. 2D (TRANSISTOR GATE VOLTAGES)
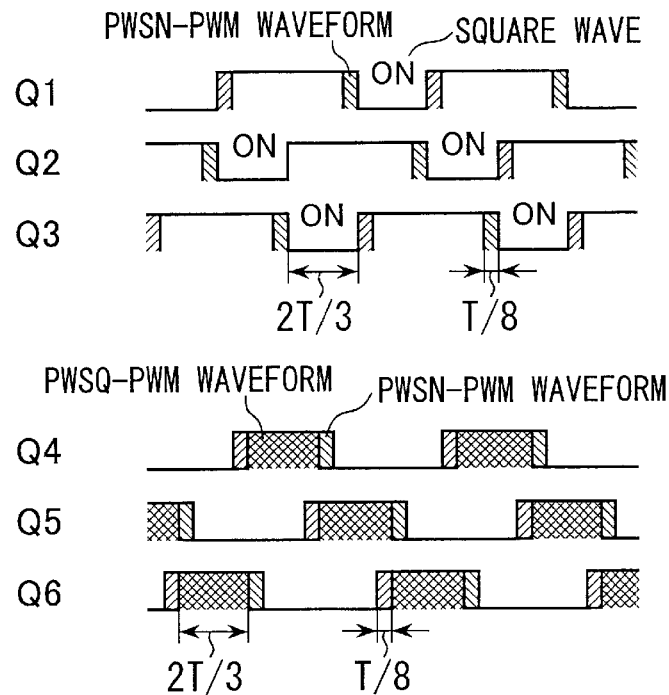

FIG. 8A (GATE VOLTAGE)
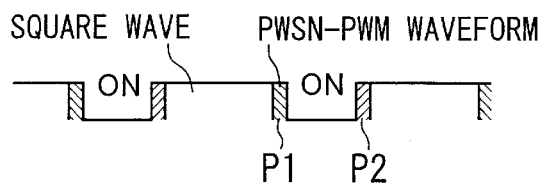
FIG. 8B (STEP VOLTAGE & TRIANGULAR VOLTAGE/ON TIME (P1))
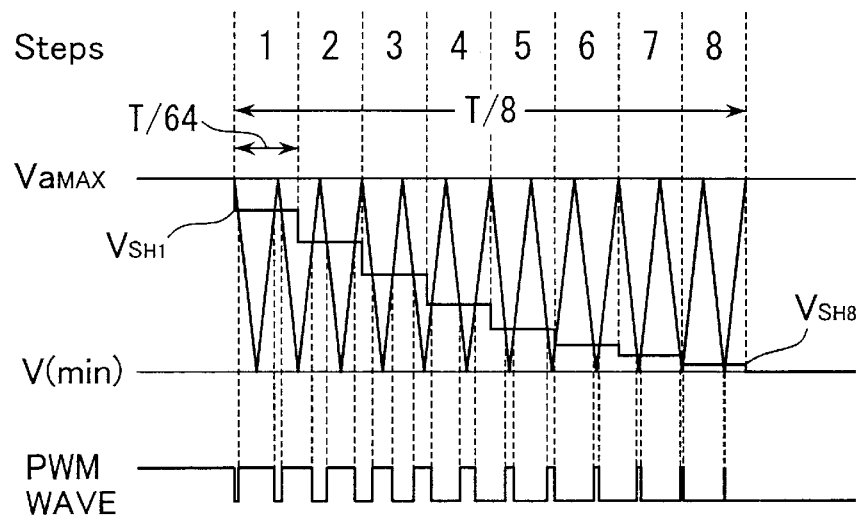
FIG. 8C (STEP VOLTAGE & TRIANGULAR VOLTAGE/OFF TIME (P2))
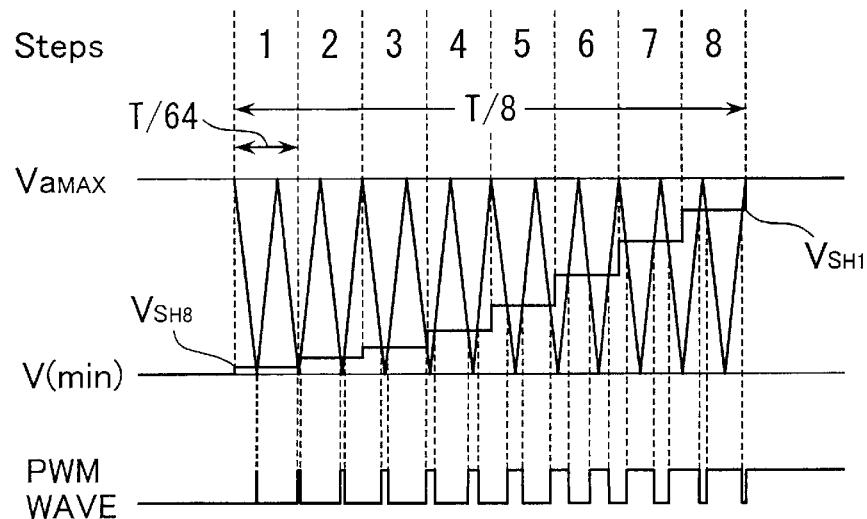

FIG. 9A (GATE VOLTAGE)
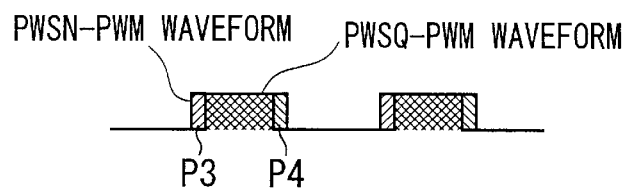
FIG. 9B (STEP VOLTAGE & TRIANGULAR VOLTAGE/ON TIME (P3))
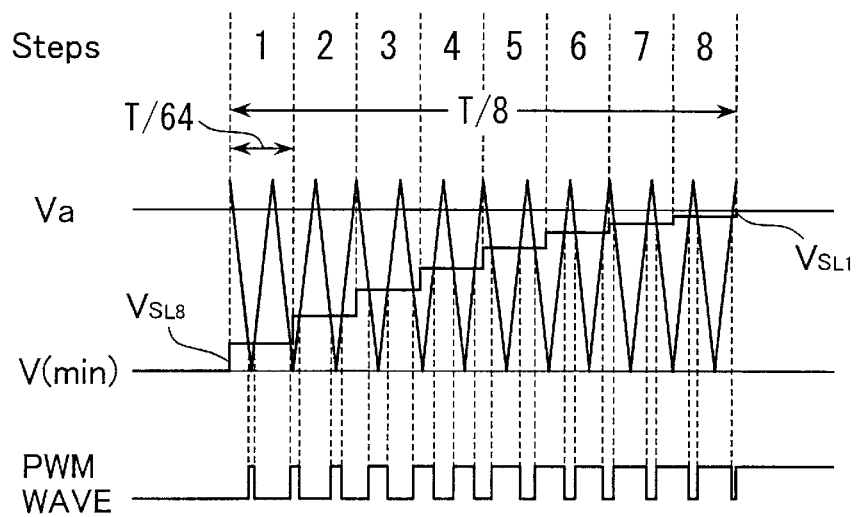
FIG. 9C (STEP VOLTAGE & TRIANGULAR VOLTAGE/OFF TIME (P4))
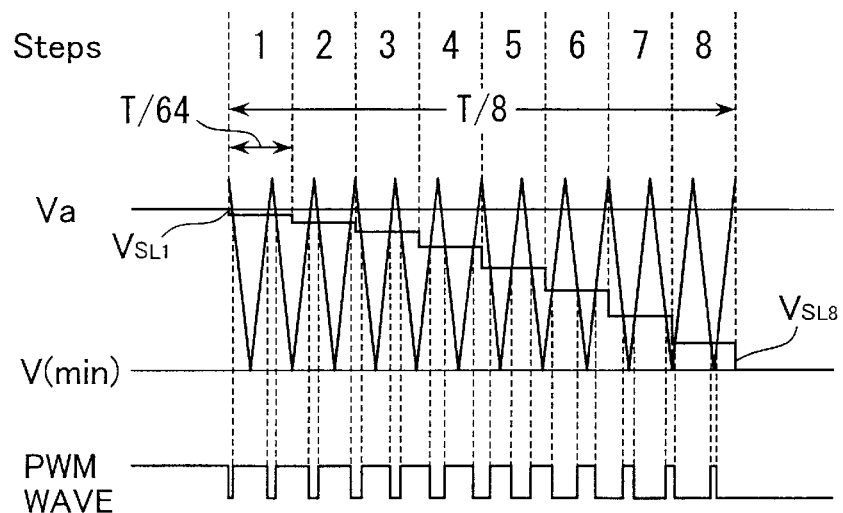

FIG. 11A (EXCITING COIL ENERGIZING TIMING)
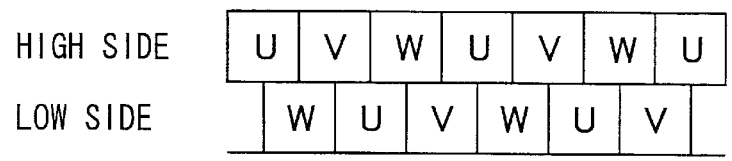
FIG. 11B (TRANSISTOR CONTROL TIMING)
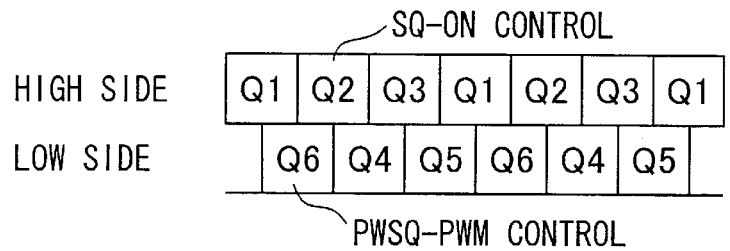
FIG. 11C (DETECTED SIGNAL)
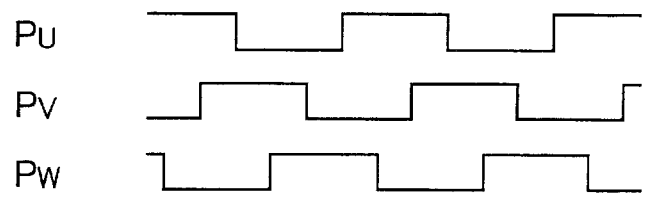
FIG. 11D (TRANSISTOR GATE VOLTAGES)
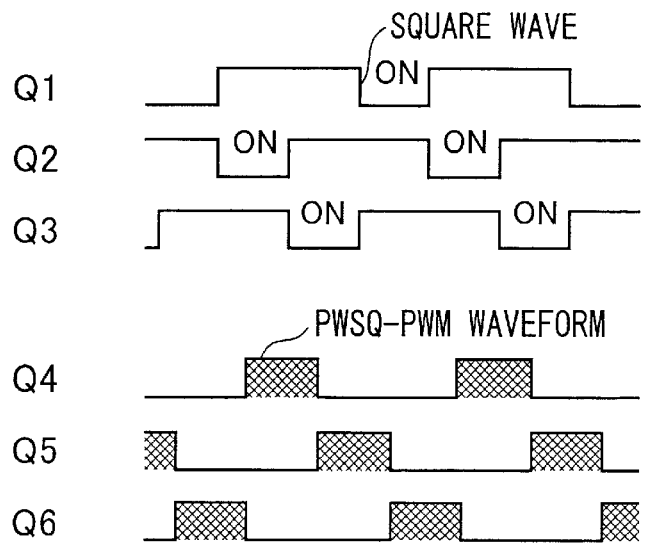
PRIOR ART

US 6,580,236 B2

BRUSHLESS MOTOR DRIVE CIRCUIT HAVING LOW NOISE AND HIGH EFFICIENCY

FIELD OF THE INVENTION

The present invention relates generally to a brushless motor drive circuit formed as a semiconductor integrated circuit.

More particularly, the present invention relates a brushless motor drive circuit in which induced voltages generated across exciting coils of respective phases are detected and, for each of the exciting coils of respective phases, a rotor position signal is produced which is a square wave signal and whose half period corresponds to a period from a polarity inversion of the induced voltage to the next polarity inversion of the induced voltage. Based on the rotor position signals, switching elements are square wave on-controlled and/or pulse width converted square wave PWM (Pulse Width Modulation) controlled, and thereby excitation of the exciting coils is controlled.

BACKGROUND OF THE INVENTION

FIG. 10 shows a circuit including a conventional semiconductor integrated circuit 100 for driving a brushless motor. As shown in FIG. 10, the semiconductor integrated circuit 100 is coupled with a star connection type three-phase brushless motor 1, a microcomputer 2 for supplying a rotation speed control signal of the motor 1, a DC power source $V_{DD}$, and the ground. Exciting coils 3, 4 and 5 of the motor 1 are star-connected and correspond to U phase, V phase and W phase, respectively. One terminals of the exciting coils 3, 4 and 5 are coupled to a U phase terminal U, a V phase terminal V and a W phase terminal W, respectively, and the other terminals of the exciting coils 3, 4 and 5 are commonly coupled, as the midpoint, to a midpoint terminal C. The microcomputer 2 is coupled to an input terminal S.

The semiconductor integrated circuit 100 comprises a bridge output circuit 6 which supplies excitation currents for respective phases to the exciting coils 3, 4 and 5 in predetermined timing. The current value of each of the excitation currents is controlled by PWM control. The semiconductor integrated circuit 100 also comprises a detector circuit 7 which senses induced voltages generated across the exciting coils 3, 4 and 5, and produces square wave rotor position signals PU, PV and PW. A half period, that is, π radian, of each of the rotor position signals PU, PV and PW corresponds to a period from a zero-cross in which a polarity of an induced voltage inverts to the next zero-cross in which the polarity of the induced voltage inverts next time. The semiconductor integrated circuit 100 further comprises an inner voltage generating circuit 8 for generating an inner voltage as a voltage for pulse width modulation which varies according to a voltage of the rotation speed control signal supplied from the microcomputer 2. The semiconductor integrated circuit 100 also comprises a triangular wave generating circuit 9 for generating a triangular wave voltage, and a comparator 10 for generating a PWM signal obtained by pulse width modulating the inner voltage from the inner voltage generating circuit 8 by using the triangle wave voltage from the triangle wave generating circuit 9. The semiconductor integrated circuit 100 further comprises a control circuit 11 which performs excitation or current conduction timing control and PWM control for the bridge output circuit 6, based on the PWM signal from the comparator 10 and the rotor position signal from the detector circuit 7.

The bridge output circuit 6 comprises P-channel type MOS transistors Q1, Q2 and Q3 which control current conduction timing into the exciting coils 3, 4 and 5, respectively, and N-channel type MOS transistors Q4, Q5 and Q6 which perform PWM control of current values to the exciting coils 3, 4 and 5 in predetermined timing. The control circuit 11 supplies current conduction timing control signals to the gate electrodes of the MOS transistors Q1, Q2 and Q3, and supplies current quantity control signals to the MOS transistors Q4, Q5 and Q6. The main current paths of the MOS transistors Q1 and Q4, the MOS transistors Q2 and Q5, and the MOS transistors Q3 and Q6 are respectively coupled in series. The source electrodes of the MOS transistors Q1, Q2 and Q3 are commonly coupled to the power source $V_{DD}$ and the source electrodes of the MOS transistors Q4, Q5 and Q6 are commonly coupled to the ground. The common connection node between the MOS transistors Q1 and Q4, the common connection node between the MOS transistors Q2 and Q5 and the common connection node between the MOS transistors Q3 and Q6 are coupled with the terminals U, V and W of the motor 1, respectively.

The detector circuit 7 detects or senses the induced voltages generated across the exciting coils 3, 4 and 5 via the terminals U, V, W and C. By using integrating circuits and comparators which are provided within the detector circuit 7 and which are not shown in the drawing, the detector circuit 7 produces the square wave rotor position signals PU, PV and PW. A half period, that is, π radian, of each of the rotor position signals PU, PV and PW corresponds to a period from a zero-cross in which a polarity of an induced voltage inverts to the next zero-cross in which the polarity of the induced voltage inverts again next time.

The control circuit 11 receives the PWM signal from the comparator 10 and the rotor position signals PU, PV and PW from the detector circuit 7. Thereby, the control circuit 11 determines current conduction timing to the respective exciting coils 3, 4 and 5. The control circuit 11 produces the current conduction timing control signals supplied to the gate electrodes of the MOS transistors Q1, Q2 and Q3 and the current quantity control signals supplied to the gate electrodes of the MOS transistors Q4, Q5 and Q6. At a start time of the motor, the induced voltages are not generated across the exciting coils 3, 4 and 5, so that the detector circuit 7 does not produce the rotor position signals PU, PV and PW. Therefore, at a start time of the motor, predetermined start pattern signals are supplied to the control circuit 11 from a start circuit not shown in the drawing.

With reference to FIG. 10 and FIGS. 11A–11D, an explanation will be made on an operation of the semiconductor integrated circuit 100 which has the above-mentioned structure, when the semiconductor integrated circuit 100 is coupled with the motor 1 as shown in FIG. 10. A detailed explanation on the control of current conduction timing and current quantities of the respective exciting coils 3, 4 and 5 will be provided later. The control circuit 11 sets the current conduction timing as shown in FIG. 11A. As shown in FIG. 11D, the control circuit 11 supplies the current conduction timing control signals of square waves to the gate electrodes of the MOS transistors Q1, Q2 and Q3, and supplies the current quantity control signals to the gate electrodes of the MOS transistors Q4, Q5 and Q6 at respective timing. Each of the current quantity control signals is a pulse width converted square wave PWM signal and has a constant on-duty cycle during each control timing. The on-duty cycle of the pulse width converted square wave PWM signal varies depending on the required current quantity. In order shown in FIG. 11B, the MOS transistors Q1, Q2 and Q3 are on-controlled by square wave signals (SQ-ON CONTROL), and also the MOS transistors Q4, Q5 and Q6 are pulse width converted square wave PWM controlled (PWSQ-PWM CONTROL). In the motor 1, among the exciting coils 3, 4 and 5 of three phases, a current flows from the exciting coil of the phase coupled to a high side voltage, i.e., $V_{DD}$, to the exciting coil of the phase coupled to a low side voltage, i.e., the ground, in order shown in FIG. 11A. That is, the exciting coils of two phases are sequentially energized in order of phase shown in FIG. 11A and thereby the rotor of the motor 1 rotates. The direction of the current varies such that the following 6 conditions are sequentially repeated. That is, a condition a current flows from the terminal U to the terminal V, a condition a current flows from the terminal U to the terminal W, a condition a current flows from the terminal V to the terminal W, a condition a current flows from the terminal V to the terminal U, a condition a current flows from the terminal W to the terminal U, and a condition a current flows from the terminal W to the terminal V.

The current conduction or energizing timing of the respective exciting coils 3, 4 and 5 of the motor 1 is controlled as follows. The induced voltages generated across the respective exciting coils 3, 4 and 5 are supplied to the detector circuit 7 via the terminals U, V, W and C. By using the integrating circuits and the comparators which are provided inside the detector circuit 7 and which are not shown in the drawing, the detector circuit 7 produces the rotor position signals PU, PV and PW having waveforms shown in FIG. 11C and supplies these signals to the control circuit 11. After receiving the rotor position signals PU, PV and PW, the control circuit 11 determines the current conduction timing based on the rotor position signals PU, PV and PW, and supplies the gate voltage signals as shown in FIG. 11D to the MOS transistors Q1, Q2 and Q3 and to the MOS transistors Q4, Q5 and Q6. Thereby, the MOS transistors Q1, Q2 and Q3 are square wave on-controlled and the MOS transistors Q4, Q5 and Q6 are pulse width converted square wave PWM controlled, in accordance with the timing shown in FIG. 11B.

On the other hand, quantity of current supplied to the exciting coils 3, 4 and 5 of the motor 1 is controlled as follows. That is, when the rotation speed control signal is supplied to the inner voltage generating circuit 8 from the microcomputer 2, the inner voltage generating circuit 8 converts the rotation speed control signal into an inner voltage signal which is supplied to the non-inverting (+) input terminal of the comparator 8. The comparator 8 compares the inner voltage signal with a triangular wave signal from the triangular wave generating circuit 9 and generates a PWM signal supplied to the control circuit 11. The PWM signal is used for controlling a motor current such that a desired rotation speed is obtained. By using the PWM signal and based on the current conduction timing determined as mentioned above, the current quantity control signals are generated which are used for performing the pulse width converted square wave PWM control according to the timing shown in FIG. 11B. The current quantity control signals are supplied to the gate electrodes of the MOS transistors Q4, Q5 and Q6 as shown in FIG. 11D. In combination with the square wave on-control of the MOS transistors Q1, Q2 and Q3 whose timing is shown in FIG. 11B, the direction of current flowing through the exciting coils varies such that the above-mentioned 6 conditions are sequentially repeated and, thereby, the motor 1 rotates. The rotation speed control signal supplied from the microcomputer 2 is produced as follows. That is, in an internal circuit not shown in the drawing, a rotation speed signal is generated from the rotor position signals PU, PV and PW obtained by the detector circuit 7, and supplied to the microcomputer 2. The microcomputer 2 compares the rotation speed signal with a signal corresponding to a desired rotation speed, and generates the rotation speed control signal from the difference voltage therebetween.

In this way, the MOS transistors Q1, Q2 and Q3 are square wave on-controlled and the MOS transistors Q4, Q5 and Q6 are pulse width converted square wave PWM controlled, and thereby rotation of the motor 1 is controlled.

In the above-mentioned semiconductor integrated circuit 100, the gate voltage waveforms of the MOS transistors Q1, Q2 and Q3, that is, the current conduction timing control signals, are on-controlled by using square wave signals. Also, the gate voltage waveforms of the MOS transistors Q4, Q5 and Q6, that is, the current quantity control signals, are PWM controlled for respective control timings by using pulse width converted square wave PWM waveforms each having a constant on-duty cycle. However, since the gate voltage waveforms are square waves, the motor 1 generates much noise at rising edge portions and falling edge portions of these waveforms.

A motor drive apparatus for solving such problem is proposed, for example, in Japanese patent laid-open publication No. 11-235079. In the motor drive apparatus disclosed in this publication, current signals supplied to motor exciting coils are soft switching controlled such that rising edges and falling edges of the current signals are sloped. In order to perform such soft switching control, in the motor drive apparatus disclosed in this publication, phase switching trapezoidal wave signals which are pulse signals obtained by sloping rising and falling edges of current conducting position signals, and composite trapezoidal wave signals are produced. The slope of the phase switching trapezoidal wave signals and composite trapezoidal wave signals is produced as follows. That is, pulses Tg are produced in response to the triggers by the rising and falling edges of the respective current conducting position signals, and pulses Vslope are produced in response to the triggers by the pulses Tg. Based on the pulses Vslope, the above-mentioned slope is produced, and therefore the slope is constant regardless of the rotation speed of the motor. Also, the rising and falling edges of the current conducting position signals are utilized as the rising and falling edges of the phase switching trapezoidal wave signals and composite trapezoidal wave signals as they are.

In the motor drive apparatus disclosed in the above-mentioned publication, current signals supplied to motor exciting coils are soft switching controlled such that rising edges and falling edges of the current signals are sloped. Therefore, magnetic flux of the rotor varies according to a sine function, and therefore deviation occurs between exciting magnetic flux of the motor exciting coils and magnetic flux of the rotor, so that effect of reducing noise becomes low. Therefore, in the motor drive apparatus disclosed in the above-mentioned publication, countermeasures against noise were insufficient.

Also, in order to perform the above-mentioned soft switching control, phase switching trapezoidal wave signals and composite trapezoidal wave signals are produced which are pulse signals obtained by sloping rising and falling edges of the current conducting position signals. The slope of the phase switching trapezoidal wave signals and composite trapezoidal wave signals is produced by first generating the pulses Tg in response to the triggers by the rising and falling edges of the respective current conducting position signals, and then by producing the pulses Vslope in response to the triggers by the pulses Tg. Based on the pulses Vslope, the above-mentioned slope is produced, and therefore the slope is constant regardless of the rotation speed of the motor. Therefore, when the rotation speed is low, the ratio of widths of the rising and falling edges of the current conducting position signals to a period of each of the current conducting position signals becomes small. Therefore, effect of reducing noise becomes low, and countermeasures against noise become insufficient.

Also, the rising and falling edges of the current conducting position signals are utilized as the rising and falling edges of the phase switching trapezoidal wave signals and composite trapezoidal wave signals as they are. Therefore, current conduction or energizing of the exciting coils is not performed in the optimum condition with respect to the position of the rotor, and it was impossible to obtain high rotation efficiency.

SUMMARY OF THE INVENTION

Therefore, it is an object of the present invention to provide a drive circuit for a brushless motor which can reduce noise of the brushless motor.

It is another object of the present invention to provide a drive circuit for a brushless motor which can reduce noise of the brushless motor even in a low rotation speed.

It is still another object of the present invention to provide a drive circuit for a brushless motor which can provide high rotation efficiency and which can reduce noise of the brushless motor.

It is still another object of the present invention to provide a drive circuit for a brushless motor which has relatively simple circuit structure and which can reduce noise of the brushless motor.

It is still another object of the present invention to obviate the disadvantages of the conventional drive circuit for a brushless motor.

According to an aspect of the present invention, there is provided a brushless motor drive circuit for driving a brushless motor which has a rotor and exciting coils of respective phases, the brushless motor drive circuit comprising: a detector circuit which detects an induced voltage generated across the exciting coil of each phase; a rotor position signal generating circuit which produces a square wave rotor position signal for the exciting coil of each phase, a half period of the rotor position signal corresponding to a time period from a polarity inversion of the induced voltage to the next polarity inversion of the induced voltage; a control circuit which, based on the rotor position signal, performs excitation control of the exciting coils by controlling switching elements for conducting excitation currents via the exciting coils, by using square wave on-control and/or pulse width converted square wave pulse width modulation (PM) control; and a pulse width converted sinusoidal wave PWM signal generating circuit which generates a pulse width converted sinusoidal wave PWM signal whose pulse width varies according to a sinusoidal function; wherein excitation of the exciting coils is controlled based on the pulse width converted sinusoidal wave PWM signal immediately before and after the square wave on-controlled portion and/or the pulse width converted square wave PWM controlled portion.

In this case, it is preferable that the exciting coils comprise three phase exciting coils, the excitation control comprises sequential excitation of exciting coils every two phases, and the switching elements comprises switching elements for controlling current conduction timing and switching elements for controlling current quantity, and wherein the switching elements for controlling current conduction timing are square wave on-controlled and the switching elements for controlling current quantity are pulse width converted square wave PWM controlled.

According to another aspect of the present invention, there is provided a brushless motor drive circuit for driving a brushless motor which has a rotor and exciting coils of three phases, the brushless motor drive circuit comprising: a detector circuit which detects an induced voltage generated across the exciting coil of each phase; a rotor position signal generating circuit which produces a square wave rotor position signal for the exciting coil of each phase, a half period of the rotor position signal corresponding to a time period from a polarity inversion of the induced voltage to the next polarity inversion of the induced voltage; a control circuit which, based on the rotor position signal, performs excitation control of the exciting coils by controlling switching elements for current conduction timing control and switching elements for current quantity control, the excitation control being performed by sequentially exciting the exciting coils of every two phases, the switching elements for current conduction timing control being square wave on-controlled and the switching elements for current quantity control being pulse width converted square wave PWM controlled; and a pulse width converted sinusoidal wave PWM signal generating circuit which generates a pulse width converted sinusoidal wave PWM signal whose pulse width varies according to a sinusoidal function; wherein excitation of the exciting coils is controlled based on the pulse width converted sinusoidal wave PWM signal immediately before and after the square wave on-controlled portion and/or the pulse width converted square wave PWM controlled portion.

It is preferable that a length of a half period of each of the rotor position signals of respective phases is counted to obtain a count value of T, wherein, from the count value of T, a value of T/2 is obtained by an operation, wherein a T/2 elapsed point in time is obtained which point is after T/2 from each edge immediately after the end of count of a half period of a rotor position signal of a phase in which the half period is counted, wherein the T/2 elapsed point in time is determined to be a switching point between the square wave on-control timings of two phases different from the phase in which the half period is counted or to be a switching point between the pulse width converted square wave PWM control timings of two phases different from the phase in which the half period is counted.

It is also preferable that the timing width of each of the square wave on-control portion and the pulse width converted square wave PWM control portion is 2T/3.

It is further preferable that the timing width of the pulse width converted sinusoidal wave PWM control portion is smaller than T/6.

It is advantageous that the timing width of the pulse width converted sinusoidal wave PWM control portion is determined based on the value T.

It is also advantageous that the timing width of the pulse width converted sinusoidal wave PWM control portion is a value obtained by dividing T by a multiple of 2.

It is further advantageous that the timing width of the pulse width converted sinusoidal wave PWM control portion is T/8.

It is preferable that, after obtaining T/2, T/4 and T/8 by an operation from T and obtaining (T/4+T/8) and (T/2+T/8) by an operation, a time period having a width of T/8 from a T/2 elapsed time to a (T/2+T/8) elapsed time from an edge immediately after the count end of the rotor position signal, and a time period having a width of T/8 from a (T/4+T/8) elapsed time to a T/2 elapsed time are determined to be the timing widths of the pulse width converted sinusoidal wave PWM control portions for other two phases different from the phase in which the rotor position signal is counted.

It is also preferable that, after obtaining T/64 by an operation from T and producing 8 shift signal which are sequentially shifted by T/64 in the timing width T/8 of the pulse width converted sinusoidal wave PWM control, a step voltage is obtained by dividing a voltage for pulse width modulation into 8 divided voltages by using voltage dividing ratios determined based on a sinusoidal function and by sequentially selecting a divided voltage from the 8 divided voltages by using the shift signals, and the pulse width converted sinusoidal wave PWM signal is obtained by pulse width modulating the step voltage by using a triangular wave voltage.

It is further preferable that the voltage for pulse width modulation, which is used for producing the pulse width converted sinusoidal wave PWM signals for performing the pulse width converted sinusoidal wave PWM control before and after the pulse width converted square wave PWM control, is also used for producing the pulse width converted square wave PWM signals for performing the pulse width converted square wave PWM control and is a voltage for performing pulse width modulation which varies depending on the rotation speed control signal, and wherein the voltage for pulse width modulation, which is used for producing the pulse width converted sinusoidal wave PWM signals for performing the pulse width converted sinusoidal wave PWM control before and after the square wave on-control, is the maximum value of a voltage for performing pulse width modulation which varies depending on the rotation speed control signal.

According to still another aspect of the present invention, there is provided a brushless motor drive circuit for driving a brushless motor which has a rotor and exciting coils of three phases, the brushless motor drive circuit comprising: a bridge output circuit which includes switching elements for current conduction timing control and switching elements for current quantity control and which performs excitation control by sequentially exciting the exciting coils every two phases; a detector circuit which detects an induced voltage generated across the exciting coil of each phase; a rotor position signal generating circuit which produces a square wave rotor position signal for the exciting coil of each phase, a half period of the rotor position signal corresponding to a time period from a polarity inversion of the induced voltage to the next polarity inversion of the induced voltage; a control circuit which, based on the rotor position signal, performs excitation control of the exciting coils by square wave on-controlling the switching elements for current conduction timing control and by pulse width converted square wave pulse width modulation (PWM) controlling the switching elements for current quantity control; a timing signal/shift signal generating circuit which generates timing signals and shift signals; and a pulse width converted sinusoidal wave PWM signal generating circuit which generates a pulse width converted sinusoidal wave PWM signal whose pulse width varies according to a sinusoidal function; wherein excitation of the exciting coils is controlled based on the pulse width converted sinusoidal wave PWM signal immediately before and after the square wave on-control portion and/or the pulse width converted square wave PWM control portion.

In this case, it is preferable that the timing signal/shift signal generating circuit comprises a T-counter which counts a length of a half period of each of the rotor position signals and outputs the count value obtained by this count as T, a hold circuit which holds the count value T, and an operation circuit which operates the count value T held by the hold circuit, the value T outputted from the T-counter and the rotor position signal to produce timing signals and shift signals.

It is also preferable that the operation circuit comprises: a T/2 operation circuit, a T/4 operation circuit, a T/8 operation circuit and a T/64 operation circuit which, based on the value T held in the hold circuit, produce T/2 signal, T/4 signal, T/8 signal and T/64 signal, respectively; a timing signal generating circuit which logically processes the T/2 signal, the T/4 signal, the T/8 signal, the T value from the T-counter and the rotor position signal to produce the timing signals; and a shift signal generating circuit which logically processes the T/64 signal and the timing signals to produce the shift signals.

It is further preferable that the timing signal generating circuit produces a first timing signal which has an edge at a point after elapsing T/2, a second timing signal which has an edge at a point after elapsing (T4+T/8), a third timing signal which has an edge at a point after elapsing (T/2+T/8), from an edge immediately after the count end of the rotor position signal.

It is advantageous that the control circuit produces the pulse width converted sinusoidal wave PWM control timing portions which include a timing portion having a width of T/8 from an edge of the first timing signal to an edge of the third timing signal obtained by an exclusive OR logical operation between the first timing signal and the third timing signal, and a timing portion having a width of T/8 from an edge of the second timing signal to an edge of the first timing signal obtained by an exclusive OR logical operation between the first timing signal and the second timing signal.

It is also advantageous that the pulse width converted sinusoidal wave PWM signal generating circuit comprises: a first step voltage generating circuit which receives the shift signals and the maximum value of a voltage for performing pulse width modulation that is used for producing the pulse width converted square wave PWM signals for performing the pulse width converted square wave PWM control and that varies depending on the rotation speed control signal, to produce a first step voltage; a second step voltage generating circuit which receives the shift signals and the voltage for performing pulse width modulation that varies depending on the rotation speed control signal, to produce a second step voltage; a first comparator which performs pulse width modulation of the first step voltage by using a triangular wave voltage and produces the pulse width converted sinusoidal wave PWM signals supplied to the switching elements for current conduction timing control; and a second comparator which performs pulse width modulation of the second step voltage by using a triangular wave voltage and produces the pulse width converted sinusoidal wave PWM signals supplied to the switching elements for current quantity control.

BRIEF DESCRIPTION OF THE DRAWINGS

These and other features, and advantages, of the present invention will be more clearly understood from the following detailed description taken in conjunction with the accompanying drawings, in which like reference numerals designate identical or corresponding parts throughout the figures, and in which:

FIGS. 2A–2D are timing diagrams illustrating detailed operation of the semiconductor integrated circuit shown in FIG. 1;

FIGS. 8A–8C are timing diagrams showing various signals relating to control of high side transistors shown in FIG. 1;

FIGS. 9A–9C are timing diagrams showing various signals relating to the control of low side transistors shown in FIG. 1;

FIGS. 11A–11D are timing diagrams illustrating detailed operation of the conventional semiconductor integrated circuit shown in FIG. 10.

DESCRIPTION OF THE PREFERRED EMBODIMENT

Figure 1:
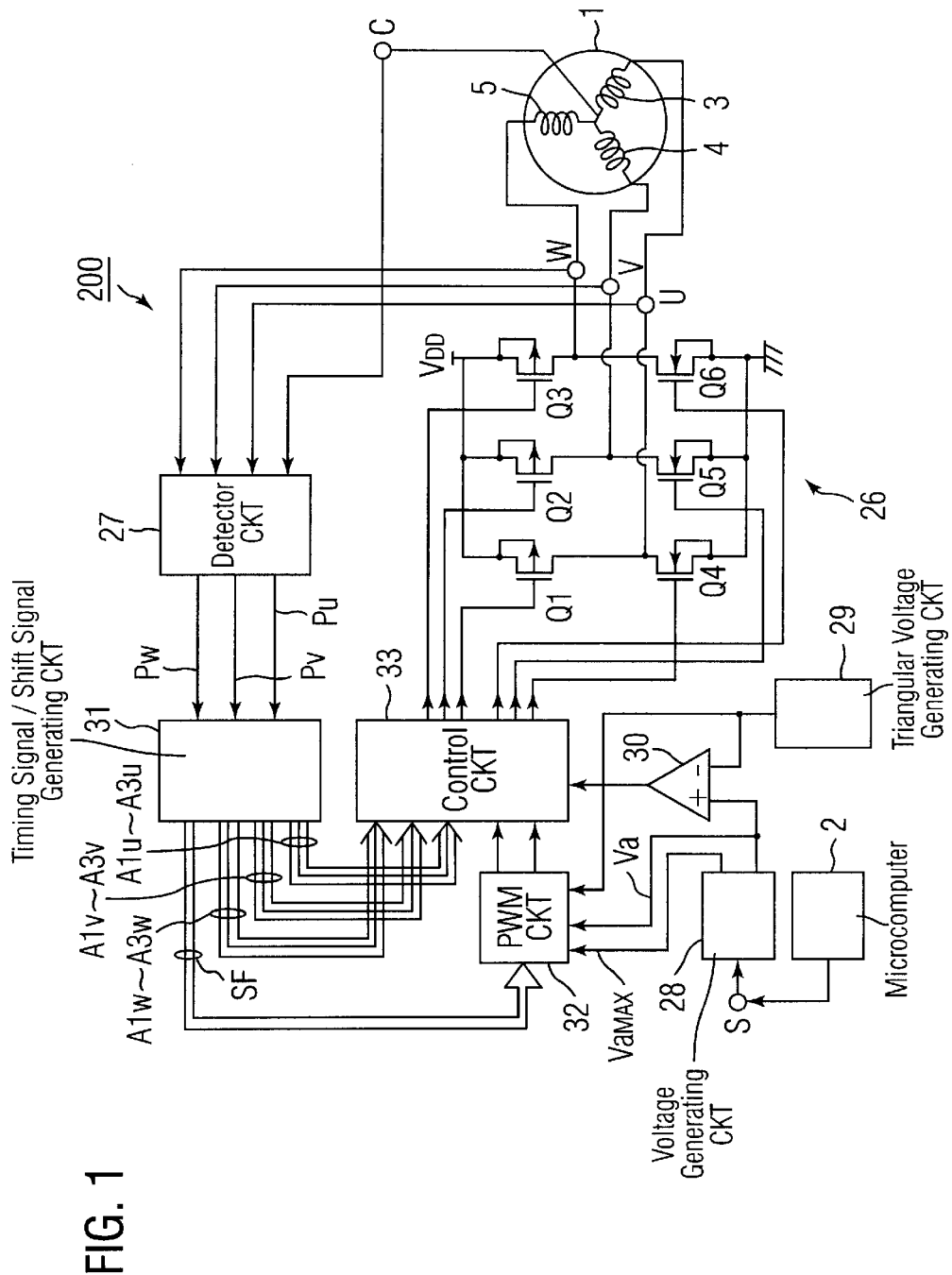
FIG. 1 is a block circuit diagram showing a circuit including a semiconductor integrated circuit for driving a brushless motor according to an embodiment of the present invention.

FIG. 1 is a block circuit diagram showing a circuit including a semiconductor integrated circuit 200 for driving a brushless motor according to an embodiment of the present invention. As shown in FIG. 1, the semiconductor integrated circuit 200 is coupled with a star connection type three-phase brushless motor 1, a microcomputer 2 for supplying a rotation speed control signal of the motor 1, a DC power source $V_{DD}$, and the ground. The exciting coils 3, 4 and 5 of the motor 1 are star-connected and correspond to U phase, V phase and W phase, respectively. One terminals of the exciting coils 3, 4 and 5 are coupled to a U phase terminal U, a V phase terminal V and a W phase terminal W, respectively, and the other terminals of the exciting coils 3, 4 and 5 are commonly coupled, as the midpoint or the center tap, to a midpoint terminal C. The microcomputer 2 is coupled to an input terminal S.

The semiconductor integrated circuit 200 comprises a bridge output circuit 26 which supplies excitation currents for respective phases to the exciting coils 3, 4 and 5 according to predetermined timing. The current value of each of the excitation currents is controlled by PWM control. The semiconductor integrated circuit 200 also comprises a detector circuit 27 which detects or senses induced voltages generated across the exciting coils 3, 4 and 5, and produces square wave rotor position signals PU, PV and PW. The semiconductor integrated circuit 200 further comprises an inner voltage generating circuit 28 for generating an inner voltage Va as a voltage for pulse width modulation which varies according to a voltage of the rotation speed control signal supplied from the microcomputer 2. The semiconductor integrated circuit 200 also comprises a triangular wave generating circuit 29 for generating a triangular wave voltage. The semiconductor integrated circuit 200 comprises a comparator 30 for pulse width modulating the inner voltage Va from the inner voltage generating circuit 28 by using the triangular wave voltage from the triangular voltage generating circuit 29 and for generating a pulse width converted square wave PWM signal whose pulse width varies according to the inner voltage Va and which has a constant on-duty cycle for each of the control timing portions.

The semiconductor integrated circuit 200 also comprises a timing signal/shift signal generating circuit 31 which receives the rotor position signals PU, PV and PW from the detector circuit 27 and produces timing signals A1U–A3U, A1V–A3V and A1W–A3W and shift signals SF. The semiconductor integrated circuit 200 further comprises a pulse width converted sinusoidal wave PWM signal generating circuit 32 which receives the inner voltage Va from the inner voltage generating circuit 28 and the shift signals SF from the timing signal/shift signal generating circuit 31 and generates pulse width converted sinusoidal wave PWM signal. The pulse width converted sinusoidal wave PWM signal is a pulse width modulated signal whose pulse width varies according to a sinusoidal or sine function.

The semiconductor integrated circuit 200 further comprises a control circuit 33 which receives the pulse width converted square wave PWM signals from the comparator 30, the pulse width converted sinusoidal wave PWM signals from the pulse width converted sinusoidal wave PWM signal generating circuit 32 and the timing signals A1U–A3U, A1V–A3V and A1W–A3W from the timing signal/shift signal generating circuit 31, and which, based on these signals, generates the current conduction timing control signals and the current quantity control signals supplied to the bridge output circuit 26.

More detailed explanation will be made on the respective circuits shown in FIG. 1.

The bridge output circuit 26 comprises P-channel type MOS transistors Q1, Q2 and Q3 as switching elements which control current conduction timing into the exciting coils 3, 4 and 5, respectively, and N-channel type MOS transistors Q4, Q5 and Q6 as switching elements which perform PWM control of current quantities to the exciting coils 3, 4 and 5 according to predetermined timing. The control circuit 33 supplies current conduction timing control signals to the gate electrodes of the MOS transistors Q1, Q2 and Q3, and supplies current quantity control signals to the MOS transistors Q4, Q5 and Q6. The main current paths of the MOS transistors Q1 and Q4, the MOS transistors Q2 and Q5, and the MOS transistors Q3 and Q6 are respectively coupled in series. The source electrodes of the MOS transistors Q1, Q2 and Q3 are commonly coupled to a power source $V_{DD}$ and the source electrodes of the MOS transistors Q4, Q5 and Q6 are commonly coupled to the ground. The connection node between the MOS transistors Q1 and Q4, the connection node between the MOS transistors Q2 and Q5 and the connection node between the MOS transistors Q3 and Q6 are coupled with the terminals U, V and W of the motor 1, respectively.

The detector circuit 27 detects or senses the induced voltages generated across the exciting coils 3, 4 and 5, via the terminals U, V, W and C. By using integrating circuits and comparators which are provided within the detector circuit 27 and which are not shown in the drawing, the detector circuit 27 produces the square wave rotor position signals PU, PV and PW. A half period, that is, π radian, of each of the rotor position signals PU, PV and PW corresponds to a period from a zero-crossing in which a polarity of the induced voltage inverts to another zero-crossing in which the polarity of the induced voltage inverts again next time.

With respect to the timing signal/shift signal generating circuit 31 and the pulse width converted sinusoidal wave PWM signal generating circuit 32, a detailed explanation thereof will be given later.

The control circuit 33 receives the pulse width converted square wave PWM signal from the comparator 30, the pulse width converted sinusoidal wave PWM signal from the pulse width converted sinusoidal wave PWM signal generating circuit 32, and the timing signals A1U–A3U, A1V–A3V and A1W–A3W from the timing signal/shift signal generating circuit 31. Thereby, the control circuit 33 produces the current conduction timing control signals supplied to the gate electrodes of the MOS transistors Q1, Q2 and Q3 of the bridge output circuit 26 and the current quantity control signals supplied to the gate electrodes of the MOS transistors Q4, Q5 and Q6 of the bridge output circuit 26.

With reference to FIG. 1 and FIGS. 2A–2D, an explanation will be made on an operation of the semiconductor integrated circuit 200 which has the above-mentioned structure, when the semiconductor integrated circuit 200 is coupled with the motor 1. The induced voltages generated across the exciting coils 3, 4 and 5 are supplied to the detector circuit 27 via the terminals U, V, W and C. The detector circuit 27 produces, via internal integrating circuits and comparators not shown in the drawing, the rotor position signals PU, PV and PW which have waveforms shown in FIG. 2C, and supplies the rotor position signals PU, PV and PW to the timing signal/shift signal generating circuit 31. Upon receipt of the rotor position signals PU, PV and PW, the timing signal/shift signal generating circuit 31 produces the timing signals A1U–A3U, A1V–A3V and A1W–A3W and the shift signals SF from the rotor position signals PU, PV and PW. The timing signals A1U–A3U, A1V–A3V and A1W–A3W are supplied to the control circuit 33, and the shift signals SF are supplied to the pulse width converted sinusoidal wave PWM signal generating circuit 32.

On the other hand, when the rotation speed control signal is supplied to the inner voltage generating circuit 28 from the microcomputer 2, the inner voltage generating circuit 28 produces the inner voltage signal Va as a voltage for pulse width modulation which varies depending on a voltage of the rotation speed control signal. The inner voltage Va is supplied to the non-inverting (+) input terminal of the comparator 30. The comparator 30 compares the inner voltage Va with a triangular wave signal from the triangular wave generating circuit 29 which is supplied to the inverting (−) input terminal of the comparator 30, and generates pulse width converted square wave PWM signals supplied to the control circuit 33. The pulse width converted square wave PWM signal is used for performing current control of the motor 1 such that a desired rotation speed is obtained. Also, the inner voltage Va from the inner voltage generating circuit 28, together with the triangular wave voltage from the triangular voltage generating circuit 29 and the shift signals SF from the timing signal/shift signal generating circuit 31 are supplied to the pulse width converted sinusoidal wave PWM signal generating circuit 32. Thereby, the pulse width converted sinusoidal wave PWM signals are generated by the pulse width converted sinusoidal wave PWM signal generating circuit 32, and are supplied to the control circuit 33. The rotation speed control signal supplied from the microcomputer 2 is produced as follows. That is, in an internal circuit not shown in the drawing, a rotation speed signal is generated from the rotor position signals PU, PV and PW obtained by the detector circuit 27, and supplied to the microcomputer 2. The microcomputer 2 compares the rotation speed signal with a signal which corresponds to a desired rotation speed and which is set in the microcomputer 2, and generates the rotation speed control signal from the difference voltage therebetween.

Upon receipt of the timing signals A1U–A3U, A1V–A3V and A1W–A3W from the timing signal/shift signal generating circuit 31, the pulse width converted square wave PWM signal from the comparator 30, and the pulse width converted sinusoidal wave PWM signal from the pulse width converted sinusoidal wave PWM signal generating circuit 32, the control circuit 33 determines the control timing of the bridge output circuit 26 as mentioned later. Based on the control timing, the control circuit 33 generates the current conduction timing control signals and the current quantity control signals for controlling the bridge output circuit 26. The current conduction timing control signals are supplied to the gate electrodes of the MOS transistors Q1, Q2 and Q3 of the bridge output circuit 26. Also, the current quantity control signals are supplied to the gate electrodes of the MOS transistors Q4, Q5 and Q6 of the bridge output circuit 26. In order shown in FIG. 2B, the MOS transistors Q1, Q2 and Q3 and the MOS transistors Q4, Q5 and Q6 are switched based on these control signals. In the motor 1, among the exciting coils 3, 4 and 5 of three phases, a current flows from the exciting coil of the phase coupled to a high side voltage, i.e., $V_{DD}$, to the exciting coil of the phase coupled to a low side voltage, i.e., the ground, in order shown in FIG. 2A. That is, the exciting coils of two phases are sequentially energized in order of phase shown in FIG. 2A and thereby the rotor of the motor 1 rotates. The direction of the current varies such that the following 6 conditions are sequentially repeated. That is, a condition a current flows from the terminal U to the terminal V, a condition a current flows from the terminal U to the terminal W, a condition a current flows from the terminal V to the terminal W, a condition a current flows from the terminal V to the terminal U, a condition a current flows from the terminal W to the terminal U, and a condition a current flows from the terminal W to the terminal V.

The control timing of the bridge output circuit 26 is determined as shown in FIG. 2B based on the timing signals A1U–A3U, A1V–A3V and A1W–A3W. The control timing of the MOS transistors Q1, Q2 and Q3, i.e., high side transistors, comprises square wave on-control (SQ-ON CONTROL) timing portions and pulse width converted sinusoidal wave PWM control (PWSN-PWM CONTROL) timing portions before and after each of the square wave on-control timing portions. The control timing of the MOS transistors Q4, Q5 and Q6, i.e., low side transistors, comprises pulse width converted square wave PWM control (PWSQ-PWM CONTROL) timing portions and pulse width converted sinusoidal wave PWM control (PWSN-PWM CONTROL) timing portions before and after each of the pulse width converted square wave PWM control timing portions.

The current conduction timing control signals and the current quantity control signals are produced by synchronizing the pulse width converted sinusoidal wave PWM signal and the pulse width converted square wave PWM signal with the above-mentioned pulse width converted sinusoidal wave PWM control timing and pulse width converted square wave PWM control timing. As shown in FIG. 2D, voltage waveforms of the current conduction timing control signals comprise square wave portions and pulse width converted sinusoidal wave PWM waveforms before and after each of the square wave portions. Voltage waveforms of the current quantity control signals comprise the pulse width converted square wave PWM waveforms and pulse width converted sinusoidal wave PWM waveforms before and after each of the pulse width converted square wave PWM waveforms.

Hereinafter, an explanation will be made on a structure of the timing signal/shift signal generating circuit 31 and the pulse width converted sinusoidal wave PWM signal generating circuit 32. Also, a detailed explanation will be made on an operation in which the square wave on-control timing, the pulse width converted square wave PWM control timing and the pulse width converted sinusoidal wave PWM control timing are produced, and on an operation in which the pulse width converted sinusoidal wave PWM signals are produced.

Figure 3:
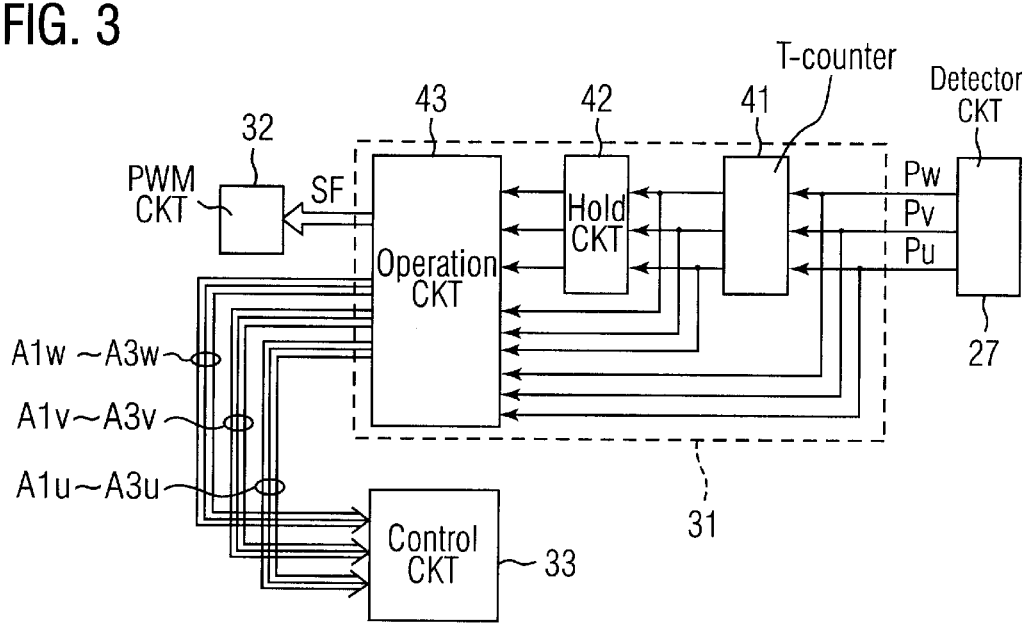
FIG. 3 is a block circuit diagram showing a circuit structure of a timing signal/shift signal generating circuit included in the semiconductor integrated circuit shown in FIG. 1.

First, an explanation will be made on the timing signal/shift signal generating circuit 31. As shown in FIG. 3, the timing signal/shift signal generating circuit 31 comprises a T-counter 41, a hold circuit 42 and an operation circuit 43. The T-counter 41 counts a length of a half period of each of the rotor position signals PU, PV and PW, and outputs the count values as T-values. The hold circuit 42 holds the T-values from the T-counter 41. The operation circuit 43 performs operation on the T-values held in the hold circuit 42, the T-values from the T-counter 41 and the rotor position signals PU, PV and PW, and produces the timing signals A1U–A3U, A1V–A3V and A1W–A3W and the shift signals SF. At a start time of the motor, the induced voltages are not generated across the exciting coils 3, 4 and 5, so that the detector circuit 27 does not produce the rotor position signals PU, PV and PW. Therefore, predetermined start pattern signals are supplied to the timing signal/shift signal generating circuit 31 from a start circuit not shown in the drawing.

Figure 4:
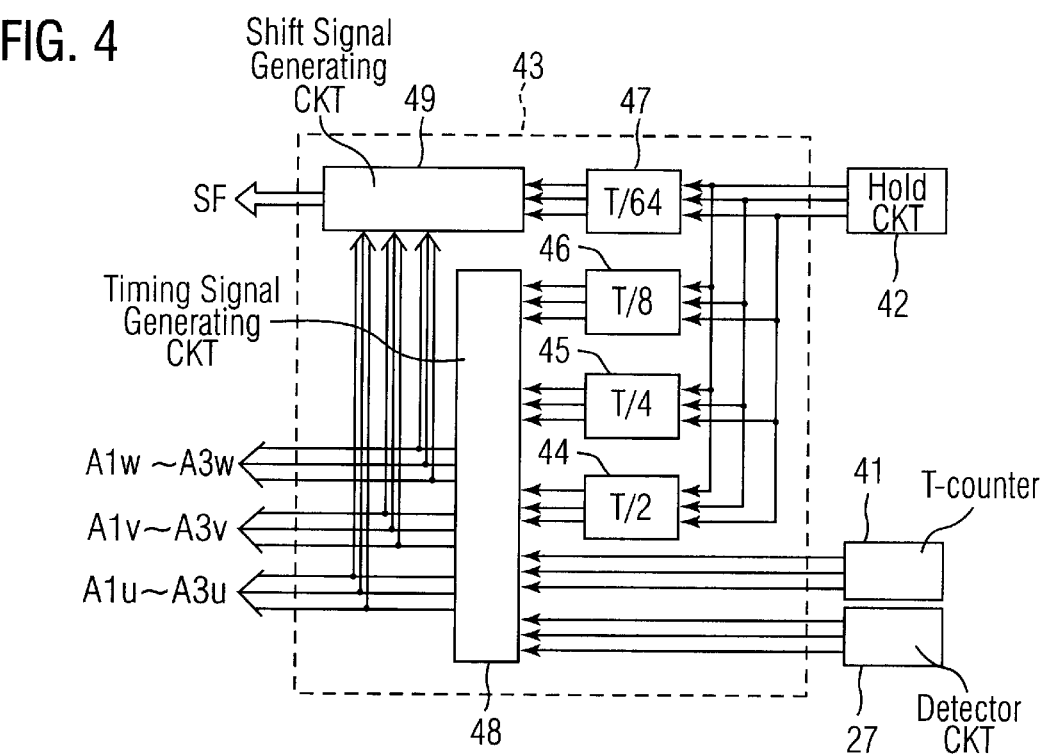
FIG. 4 is a block circuit diagram showing a circuit structure of an operation circuit included in the timing signal/shift signal generating circuit shown in FIG. 3.

FIG. 4 is a block circuit diagram showing a detailed structure of the operation circuit 43. As shown in FIG. 4, the operation circuit 43 comprises a T/2 operation circuit 44, a T/4 operation circuit 45, a T/8 operation circuit 46 and a T/64 operation circuit 47 which produce a T/2 signal, a T/4 signal, a T/8 signal and a T/64 signal, respectively, from the T-values held in the hold circuit 42. The operation circuit 43 also comprises a timing signal generating circuit 48 which performs logical operation on the T/2 signal, the T/4 signal, the T/8 signal, the T-values from the T-counter 41 and the rotor position signals PU, PV and PW, and produces the timing signals A1U–A3U, A1V–A3V and A1W–A3W. The operation circuit 48 further comprises a shift signal generating circuit 49 which performs logical operation on the T/64 signal and the timing signals A1U–A3U, A1V–A3V and A1W–A3W, and produces the shift signals SF.

In the timing signal generating circuit 48, the T/4 signl and the T/8 signal are added together, and the T/2 signal and the T/8 signal are added together. Also, the T/2 signal, the (T/4+T/8) signal and the (T/2+T/8) signal are logically operated by using the count values of the T-counter 41 and the rotor position signals PU, PV and PW, respectively, and generates the timing signals A1U–A3U, A1V–A3V and A1W–A3W. The timing signals A1U–A3U, A1V–A3V and A1W–A3W are supplied to the control circuit 33 and the shift signal generating circuit 49.

Figure 5:
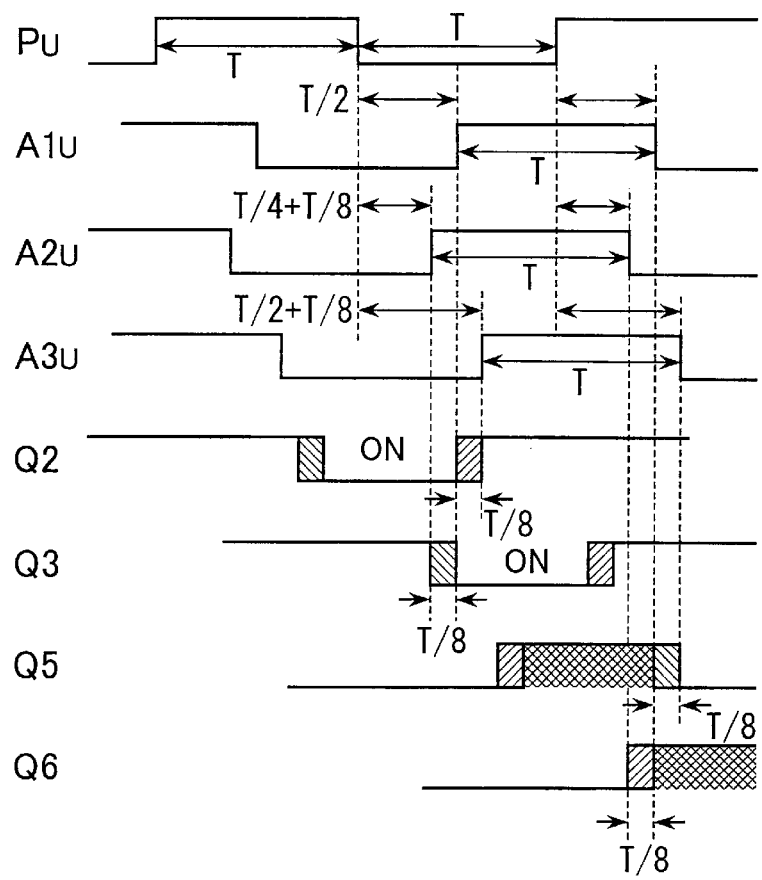
FIG. 5 is a timing diagram illustrating generation of timing signals and pulse width converted sinusoidal wave PWM control timing.

Operation of the timing signal/shift signal generating circuit 31 will now be described with respect to the generation of the timing signals A1U–A3U, A1V–A3V and A1W–A3W. With reference to FIG. 5, the operation will be described in case the timing signals A1U–A3U are produced based on the rotor position signal PU, as an example. When the condition of phase U changes from a floating phase, via a high side current conduction phase, again to a floating phase, the rotor position signal PU outputted from the detector circuit 27 is counted by the T-counter 41. That is, a high (H) level period of the rotor position signal PU, corresponding to a half period of the rotor position signal PU, is counted by the T-counter 41. The value T which is a count value counted by the T-counter 41 is supplied to the operation circuit 43. From the value T, the T/2 operation circuit 44, the T/4 operation circuit 45 and the T/8 operation circuit 46 of the operation circuit 43 produce the T/2 signal, the T/4 signal and the T/8 signal, respectively. The T/2 signal, the T/4 signal and the T/8 signal are supplied to the timing signal generating circuit 48. In the timing signal generating circuit 48, the T/4 signal and the T/8 signal are added together, and the T/2 signal and the T/8 signal are added together. Thereby, as shown in FIG. 5, the timing signals A1U–A3U are produced, i.e., are raised at respective timing portions. The timing signal A1U rises by inverting the rotor position signal PU at a time after elapsing T/2 from the falling point of time of the "H" level of the counted rotor position signal PU. The timing signal A2U rises by inverting the rotor position signal PU at a time after elapsing (T/4+T/8) from the falling point of time of the "H" level of the counted rotor position signal PU. The timing signal A3U rises by inverting the rotor position signal PU at a time after elapsing (T/2+T/8) from the falling point of time of the "H" level of the counted rotor position signal PU.

Next, when the condition of U phase changes from a floating phase, via a low side current conduction phase, again to a floating phase, the rotor position signal PU outputted from the detector circuit 27 is counted by the T-counter 41. That is, a low (L) level period of the rotor position signal PU, corresponding to a half period of the rotor position signal PU, is counted by the T-counter 41. The value T which is a count value by the T-counter 41 is supplied to the operation circuit 43. From the value T, the T/2 operation circuit 44, the T/4 operation circuit 45 and the T/8 operation circuit 46 of the operation circuit 43 produce the T/2 signal, the T/4 signal and the T/8 signal, respectively. The T/2 signal, the T/4 signal and the T/8 signal are supplied to the timing signal generating circuit 48. In the timing signal generating circuit 48, the T/4 signal and the T/8 signal are added together, and the T/2 signal and the T/8 signal are added together. Thereby, as shown in FIG. 5, the timing signals A1U–A3U are produced, i.e., fall at respective timing portions. The timing signal A1U falls by inverting the rotor position signal PU at a time after elapsing T/2 from the rising point of time of the "L" level of the counted rotor position signal PU. The timing signal A2U falls by inverting the rotor position signal PU at a time after elapsing (T/4+T/8) from the rising point of time of the "L" level of the counted rotor position signal PU. The timing signal A3U falls by inverting the rotor position signal PU at a time after elapsing (T/2+T/8) from the rising point of time of the "L" level of the counted rotor position signal PU.

Similarly, the timing signals A1V–A3V are produced based on the rotor position signals PV, and the timing signals A1W–A3W are produced based on the rotor position signals PW.

Still referring to FIG. 5, an operation of the control circuit 33 will be described with respect to the generation of the square wave on-control timing, the pulse width converted square wave PWM control timing and the pulse width converted sinusoidal wave PWM control timing, after the timing signals A1U–A3U, A1V–A3V and A1W–A3W are supplied to the control circuit 33. As an example, such operation will be described in case the timing signals A1U–A3U are produced.

At a rising point in time of the timing signal A1U, an end timing of the square wave on-control timing of the transistor Q2 which controls V phase and a start timing of the square wave on-control timing of the transistor Q3 which controls W phase are produced. Also, at a falling point in time of the timing signal A1U, an end timing of the pulse width converted square wave PWM control timing of the transistor Q5 which controls V phase and a start timing of the pulse width converted square wave PWM control timing of the transistor Q6 are produced.

Similarly, at rising points in time and falling points in time of the timing signals A1V and A1W, square wave on-control timing and the pulse width converted square wave PWM control timing are respectively produced.

By an exclusive-OR operation between the timing signals A1U and A3U, there is produced a pulse width converted sinusoidal wave PWM control timing which has a time width T/8 from a rising point in time of the timing signal A1U to a rising point in time of the timing signal A3U and which comes immediately after the end switching point of the square wave on-control timing of the transistor Q2 for controlling the V phase. There is also produced a pulse width converted sinusoidal wave PWM control timing which has a time width T/8 from a falling point in time of the timing signal A1U to a falling point in time of the timing signal A3U and which comes immediately after the end switching point of the pulse width converted square wave PWM control timing of the transistor Q5 for controlling the V phase.

Also, by an exclusive-OR operation between the timing signals A1U and A2U, there is produced a pulse width converted sinusoidal wave PWM control timing which has a time width T/8 from a rising point in time of the timing signal A2U to a rising point in time of the timing signal A1U and which comes immediately before the start switching point of the square wave on-control timing of the transistor Q3 for controlling the W phase. There is also produced a pulse width converted sinusoidal wave PWM control timing which has a time width T/8 from a falling point in time of the timing signal A2U to a falling point in time of the timing signal A1U and which comes immediately before the start switching point of the pulse width converted square wave PWM control timing of the transistor Q6 for controlling the W phase.

Similarly, based on the timing signals A1V–A3V and A1W–A3W, there are produced various pulse width converted square wave PWM control timing.

Figure 6:
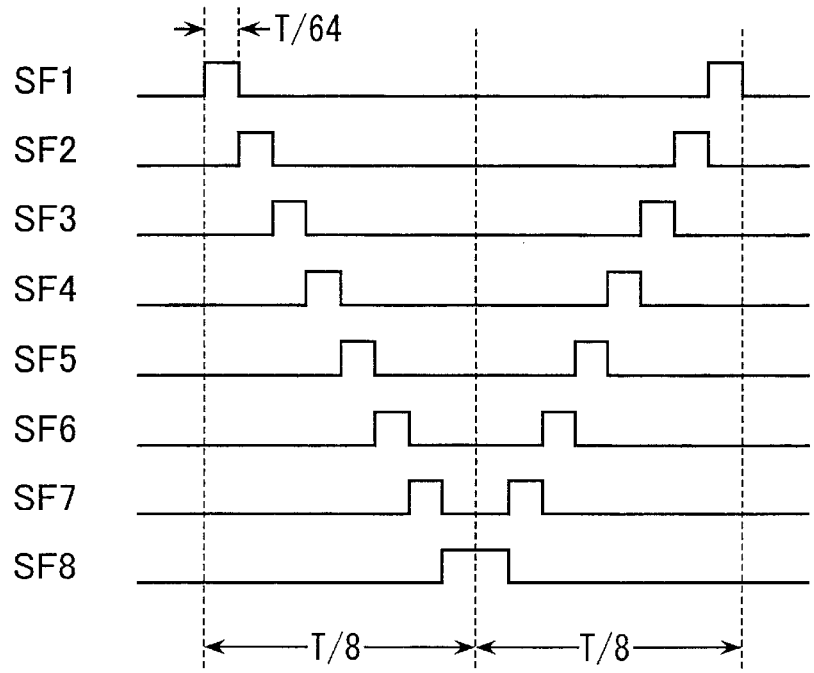
FIG. 6 is a timing diagram illustrating generation of shift signals.

The shift signal generating circuit 49 performs logical operation on the T/64 signal and the timing signals A1U–A3U, A1V–A3V and A1W–A3W, and produces the shift signals SF1–SF8. As shown in FIG. 6, the shift signals SF1–SF8 are produced which are pulse signals having the width of T/64 and shifted by T/64 over the width T/8 for each of all of U phase, V phase and W phase. Here, the respective widths T/8 are the widths of the pulse width converted sinusoidal wave PWM control timing portions just before the start switching point in time and just after the end switching point in time of the square wave on-control timing portions of the high side transistors and the pulse width converted square wave PWM control timing portions of the low side transistors mentioned above. The shift signals SF1–SF8 are supplied to the pulse width converted sinusoidal wave PWM signal generating circuit 32.

Figure 7:
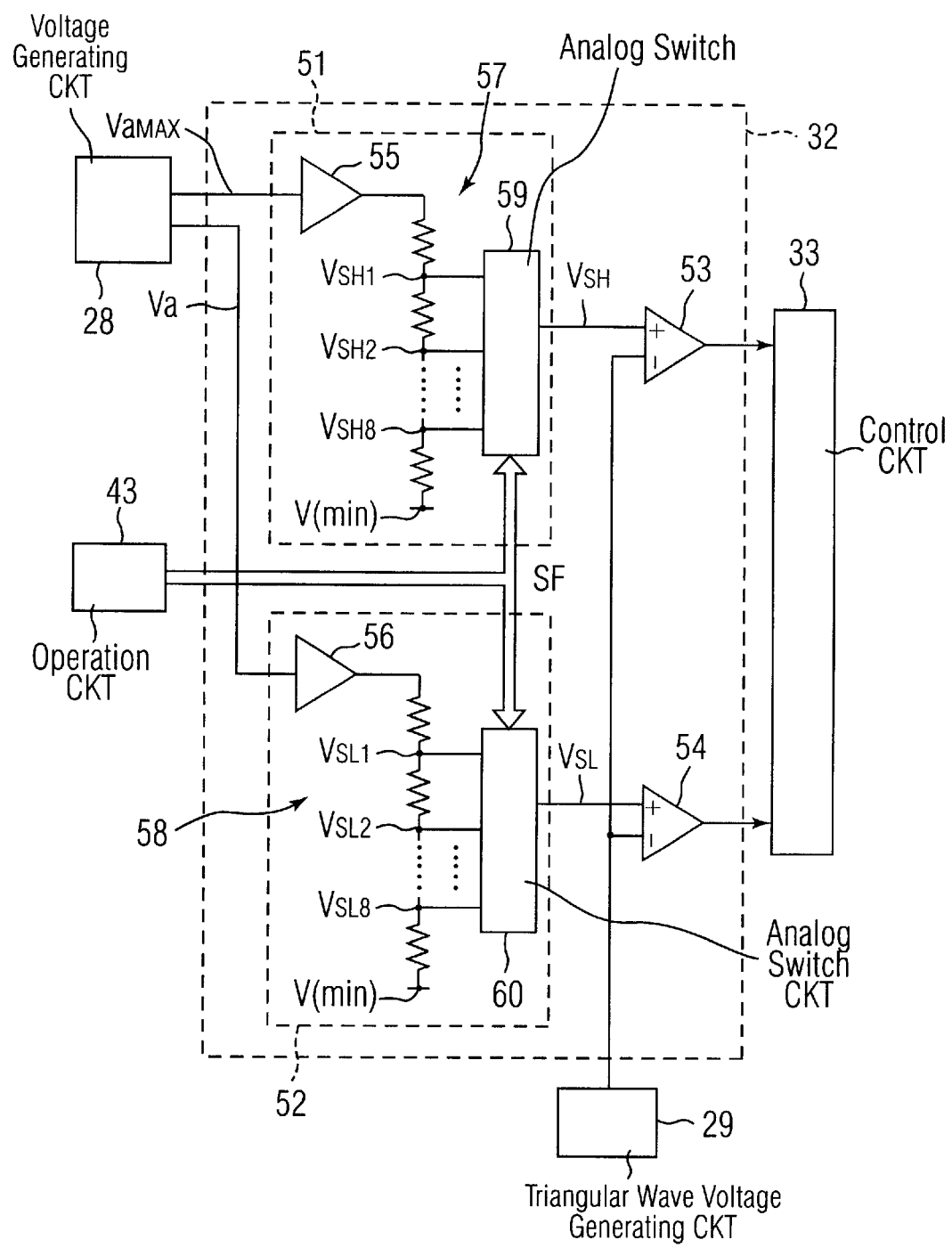
FIG. 7 is a block circuit diagram showing a circuit structure of a pulse width converted sinusoidal wave PWM signal generating circuit included in the semiconductor integrated circuit shown in FIG. 1.
Figure 10:
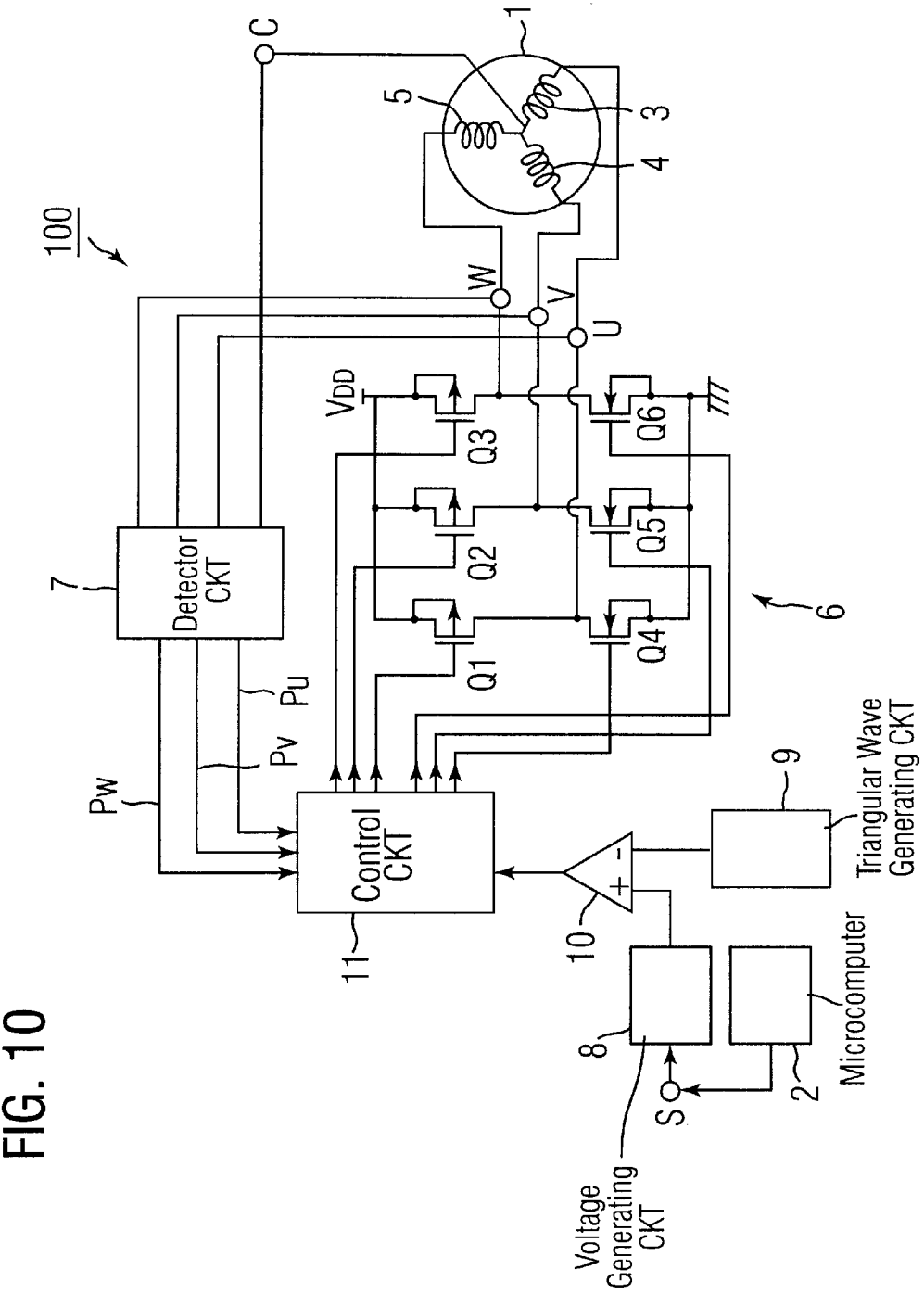
FIG. 10 is a circuit diagram showing a circuit including a conventional semiconductor integrated circuit for driving a brushless motor.

With reference to FIG. 7, an explanation will be made on the pulse width converted sinusoidal wave PWM signal generating circuit 32. The pulse width converted sinusoidal wave PWM signal generating circuit 32 comprises a first step voltage generating circuit 51, a second step voltage generating circuit 52, and comparators 53 and 54. The first step voltage generating circuit 51 receives the maximum value $Va_{MAX}$ of the inner voltage Va from the inner voltage generating circuit 28 and the shift signals SF1–SF8 from the shift signal generating circuit 49, and produces a first step voltage $V_{SH}$. The second step voltage generating circuit 52 receives the inner voltage Va from the inner voltage generating circuit 28 and the shift signals SF1–SF8 from the shift signal generating circuit 49, and produces a second step voltage $V_{SL}$. The comparator 53 pulse width modulates the first step voltage $V_{SH}$ by using a triangular wave voltage from the triangular wave voltage generating circuit 29 and, thereby, produces pulse width converted sinusoidal wave PWM signals which are supplied to the high side MOS transistors Q1, Q2 and Q3 of the bridge output circuit 26. The comparator 54 pulse width modulates the second step voltage $V_{SL}$ by using the triangular wave voltage from the triangular wave voltage generating circuit 29 and, thereby, produces pulse width converted sinusoidal wave PWM signals which are supplied to the low side MOS transistors Q4, Q5 and Q6 of the bridge output circuit 26.

The first step voltage generating circuit 51 comprises a buffer 55, a divider resistor network 57 formed of series coupled resistors, and an analog switch circuit 59. The second step voltage generating circuit 52 comprises a buffer 56, a divider resistor network 58 formed of series coupled resistors, and an analog switch circuit 60. The divider resistor networks 59 and 60 divide respective input voltages according to voltage dividing ratios which are determined based on the sine or sinusoidal functions shown in Table 1, and produce 8 divided output voltages $V_{SH1}$–$V_{SH8}$ and $V_{SL1}$–$V_{SL8}$, respectively.

TABLE 1

| High side voltage ratios | | Low side voltage ratios | |
|---|---|---|---|
| ON time | | OFF time | |
| $V_{SH1}$ | 1 − sin 10° | $V_{SL1}$ | 1 − sin 80° |
| $V_{SH2}$ | 1 − sin 20° | $V_{SL2}$ | 1 − sin 70° |
| $V_{SH3}$ | 1 − sin 30° | $V_{SL3}$ | 1 − sin 60° |
| $V_{SH4}$ | 1 − sin 40° | $V_{SL4}$ | 1 − sin 50° |
| $V_{SH5}$ | 1 − sin 50° | $V_{SL5}$ | 1 − sin 40° |
| $V_{SH6}$ | 1 − sin 60° | $V_{SL6}$ | 1 − sin 30° |
| $V_{SH7}$ | 1 − sin 70° | $V_{SL7}$ | 1 − sin 20° |
| $V_{SH8}$ | 1 − sin 80° | $V_{SL8}$ | 1 − sin 10° |
| OFF time | | ON time | |

With reference to FIGS. 8A–8C and FIGS. 9A–9C, an explanation will be made on an operation in which the pulse width converted sinusoidal wave PWM signals are produced in the pulse width converted sinusoidal wave PWM signal generating circuit 32. FIGS. 8A–8C show various signals relating to the control of the high side MOS transistors Q1, Q2 and Q3. FIGS. 9A–9C show various signals relating to the control of the low side MOS transistors Q4, Q5 and Q6.

In the first step voltage generating circuit 51, the maximum value $Va_{MAX}$ of the inner voltage Va from the inner voltage generating circuit 28 is supplied to the divider resistor network 57 via the buffer 55. The divider resistor network 57 divides the maximum voltage $Va_{MAX}$ into 8 divided voltages $V_{SH1}$–$V_{SH8}$ and supplies these divided voltages to the analog switch circuit 59. The analog switch circuit 59 also receives the shift signals SF1–SF8 and produces a step voltage $V_{SH}$ which has 8 steps within a time period of 8/T. Each step corresponds to a time period of T/64 which is generated by equally dividing a time period of 8/T by 8. Corresponding to an ON time (P1) shown in FIG. 8A, the step voltage $V_{SH}$ has a step-down waveform having 8 steps as shown in FIG. 8B. Also, corresponding to an OFF time (P2) shown in FIG. 8A, the step voltage $V_{SH}$ has a step-up waveform having 8 steps as shown in FIG. 8C. Such step voltage $V_{SH}$ is supplied to a non-inverting input of the comparator 53.

In the compatator 53, the step voltage $V_{SH}$ supplied to the non-inverting input of the comparator 53 is compared with a triangular wave voltage which is supplied to an inverting input of the comparator 53 from the triangular wave voltage generating circuit 29. Thereby, corresponding to the ON time (P1) and the OFF time (P2) shown in FIG. 8A, the pulse width converted sinusoidal wave PWM signals shown in FIG. 8B and FIG. 8C, respectively, are produced and supplied to the control circuit 33. A period of the triangular wave voltage is made smaller than the width of a step of the step voltage.

In the second step voltage generating circuit 52, the inner voltage Va from the inner voltage generating circuit 28 is supplied to the divider resistor network 58 via the buffer 56. The divider resistor network 58 divides the inner voltage Va into 8 divided voltages $V_{SL1}$–$V_{SL8}$ and supplies these divided voltages to the analog switch circuit 60. The analog switch circuit 60 also receives the shift signals SF1–SF8 and produces a step voltage $V_{SL}$ which has 8 steps within a time period of 8T. Each step corresponds to a time period of T/64 which is generated by equally dividing a time period of 8/T by 8. Corresponding to an ON time (P3) shown in FIG. 9A, the step voltage $V_{SL}$ has a step-up waveform having 8 steps as shown in FIG. 9B. Also, corresponding to an OFF time (P4) shown in FIG. 9A, the step voltage $V_{SL}$ has a step-down waveform having 8 steps as shown in FIG. 9C. Such step voltage $V_{SL}$ is supplied to a non-inverting input of the comparator 54.

In the compatator 54, the step voltage $V_{SL}$ supplied to the non-inverting input of the comparator 54 is compared with a triangular wave voltage which is supplied to an inverting input of the comparator 54 from the triangular wave voltage generating circuit 29. Thereby, corresponding to the ON time (P3) and the OFF time (P4) shown in FIG. 9A, the pulse width converted sinusoidal wave PWM signals shown in FIG. 9B and FIG. 9C, respectively, are produced and supplied to the control circuit 33.

In the above-mentioned structure, pulse width converted sinusoidal wave PWM control is performed immediately before and after the square wave on-controlled portion of the high side MOS transistors Q1, Q2 and Q3 and immediately before and after the pulse width converted square wave PWM controlled portion of the low side MOS transistors Q4, Q5 and Q6. Each of the pulse width converted sinusoidal wave PWM signals for performing the pulse width converted sinusoidal wave PWM control is produced as follows. That is, T/64 is obtained by an operation from T. Also, in T/8 which is the timing width of the pulse width converted sinusoidal wave PWM control, 8 shift signals SF are produced by sequentially shifting by a pulse width T/64. By using the shift signals SF, the voltage for pulse width modulation (Va) is divided into 8 steps by the voltage dividing ratios determined based on the sine or sinusoidal functions and thereby a step voltage is produced. The step voltage is pulse width modulated by a triangular wave voltage and, thereby, the pulse width converted sinusoidal wave PWM signal is produced.

The voltage for pulse width modulation (Va), which is used for producing the pulse width converted sinusoidal wave PWM signals for performing the pulse width converted sinusoidal wave PWM control before and after the pulse width converted square wave PWM control, is also used for producing the pulse width converted square wave PWM signals for performing the pulse width converted square wave PWM control and is a voltage for performing pulse width modulation which varies depending on the rotation speed control signal. Also, the voltage for pulse width modulation which is used for producing the pulse width converted sinusoidal wave PWM signals for performing the pulse width converted sinusoidal wave PWM control before and after the square wave on-control, is the maximum value ($Va_{MAX}$) of a voltage for performing pulse width modulation which varies depending on the rotation speed control signal. Therefore, a current supplied to each exciting coil rises and falls in a manner similar to variations in magnetic flux of the rotor which flux varies according to a sine or sinusoidal function, and it becomes possible to reduce noise of the motor.

The width of each of the pulse width converted sinusoidal wave PWM control timing portions is selected to have the duration (T/8=22.5°) which is a sixteenth (1/16) of a period of the rotor position signal. Therefore, the width of each of the pulse width converted sinusoidal wave PWM control timing portions has a value smaller than a twelfth (1/12, i.e., T/6=30°) of a period of the rotor position signal. Thus, it is possible to prevent a penetrating current from flowing between the high side MOS transistors Q1, Q2 and Q3 and the low side MOS transistors Q4, Q5 and Q6. Also, the width of each of the pulse width converted sinusoidal wave PWM control timing portions is selected to be a value which is as close as possible to a twelfth of the period of the rotor position signal, and, therefore, it is possible to obtain sufficiently large effect of the pulse width converted sinusoidal wave PWM control. Further, the width of each of the pulse width converted sinusoidal wave PWM control timing portions is selected to be a value which has a constant ratio with respect to the period of the rotor position signal, and, therefore, it is possible to reduce noise of the motor even at low rotation speed. Still further, the width of each of the pulse width converted sinusoidal wave PWM control timing portions is selected to be a value which can be obtained by dividing the value T by multiples of 2. Therefore, it is possible to realize a circuit for setting this width by using a circuit structure which logically processes the value T from the T-counter 41 and thereby to simplify the circuit structure.

In the above-mentioned embodiment, a half period of each of the rotor position signals PU, PV and PW of respective phases is counted by the T-counter 41 to obtain the value of T, and, from the value of T, the values of T/2, T/4 and T/8 are obtained by the operation circuit 43 to produce timing signals. From the timing signals, the control circuit 33 determines a T/2 elapsed point in time which is after T/2 from each edge immediately after the end of count of a half period of a rotor position signal of a phase in which a half period is counted. The T/2 elapsed point in time (from a falling edge of the rotor position signal PU, for example) is determined to be a switching point between the square wave on-control timings of the high side transistors of two phases different from the phase in which a half period is counted, and the T/2 elapsed point in time (from a rising edge of the rotor position signal PU, for example) is determined to be a switching time between the pulse width converted square wave PWM control timings of the low side transistors, as can be seen from FIG. 5. The widths of the square wave on-control timing of high side and the pulse width converted square wave PWM control timing of low side are determined to be 2T/3(=120°). Therefore, it is possible to perform optimum control in energizing the exciting coils such that the exciting coils are energized in the optimum conditions with respect to the rotor position. That is, an exciting coil through which the midpoint of the N-pole and the S-pole of the rotor passes is energized during a time period between a time T/3(60°) before and a time T/3 after the point of time in which the midpoint of the N-pole and the S-pole of the rotor passes the location of the exciting coil. Therefore, it is possible to improve rotation efficiency.

As mentioned above, in the brushless motor drive circuit according to the present invention, the pulse width converted sinusoidal wave PWM control is introduced before and after at least one of the square wave on-control and the pulse width converted square wave PWM control. Therefore, it is possible to reduce motor noise. Also, the width of each of the pulse width converted sinusoidal wave PWM control timing portions is selected to be a value which has a constant ratio with respect to the period of the rotor position signal, and, therefore, it is possible to reduce motor noise even at low rotation speed. Further, in case the motor drive circuit according to the present invention is the motor drive circuit for a 3 phase brushless motor, the T/2 elapsed point in time which is after T/2 from each edge immediately after the end of count of a half period of a rotor position signal of a phase in which the half period is counted is determined to be a switching point between the square wave on-control timings of the high side transistors of two phases different from the phase in which the half period is counted and between the pulse width converted square wave PWM control timings of the low side transistors. Therefore, it is possible to perform optimum control in energizing the exciting coils such that the exciting coils are energized in the optimum conditions with respect to the rotor position and it becomes possible to improve rotation efficiency.

In the foregoing specification, the invention has been described with reference to specific embodiments. However, one of ordinary skill in the art appreciates that various modifications and changes can be made without departing from the scope of the present invention as set forth in the claims below. For example, the present invention can be applied not only to a three phase brushless motor but also to a four phase brushless motor and the like. Accordingly, the specification and figures are to be regarded in an illustrative sense rather than a restrictive sense, and all such modifications are to be included within the scope of the present invention. Therefore, it is intended that this invention encompasses all of the variations and modifications as fall within the scope of the appended claims.

What is claimed is:

1. A brushless motor drive circuit for driving a brushless motor which has a rotor and exciting coils of respective phases, said brushless motor drive circuit comprising:

a detector circuit which detects an induced voltage generated across said exciting coil of each phase;

a rotor position signal generating circuit which produces a square wave rotor position signal for said exciting coil of each phase, a half period of said rotor position signal corresponding to a time period from a polarity inversion of said induced voltage to the next polarity inversion of said induced voltage;

a control circuit which, based on said rotor position signal, performs excitation control of said exciting coils by controlling switching elements for conducting excitation currents via said exciting coils, by using square wave on-control and/or pulse width converted square wave pulse width modulation (PWM) control; and a pulse width converted sinusoidal wave PWM signal generating circuit which generates a pulse width converted sinusoidal wave PWM signal whose pulse width varies according to a sinusoidal function;

wherein excitation of said exciting coils is controlled based on said pulse width converted sinusoidal wave PWM signal immediately before and after said square wave on-controlled portion and/or said pulse width converted square wave PWM controlled portion.

2. A brushless motor drive circuit as set forth in claim 1, wherein said exciting coils comprise three phase exciting coils, said excitation control comprises sequential excitation of exciting coils every two phases, and said switching elements comprises switching elements for controlling current conduction timing and switching elements for controlling current quantity, and wherein said switching elements for controlling current conduction timing are square wave on-controlled and said switching elements for controlling current quantity are pulse width converted square wave PWM controlled.

3. A brushless motor drive circuit for driving a brushless motor which has a rotor and exciting coils of three phases, said brushless motor drive circuit comprising:

a detector circuit which detects an induced voltage generated across said exciting coil of each phase;

a rotor position signal generating circuit which produces a square wave rotor position signal for said exciting coil of each phase, a half period of said rotor position signal corresponding to a time period from a polarity inversion of said induced voltage to the next polarity inversion of said induced voltage;

a control circuit which, based on said rotor position signal, performs excitation control of said exciting coils by controlling switching elements for current conduction timing control and switching elements for current quantity control, said excitation control being performed by sequentially exciting said exciting coils of every two phases, said switching elements for current conduction timing control being square wave on-controlled and said switching elements for current quantity control being pulse width converted square wave PWM controlled; and a pulse width converted sinusoidal wave PWM signal generating circuit which generates a pulse width converted sinusoidal wave PWM signal whose pulse width varies according to a sinusoidal function;

wherein excitation of said exciting coils is controlled based on said pulse width converted sinusoidal wave PWM signal immediately before and after said square wave on-controlled portion and/or said pulse width converted square wave PWM controlled portion.

4. A brushless motor drive circuit as set forth in claim 3, wherein a length of a half period of each of said rotor position signals of respective phases is counted to obtain a count value of T, wherein, from said count value of T, a value of T/2 is obtained by an operation, wherein a T/2 elapsed point in time is obtained which point is after T/2 from each edge immediately after the end of count of a half period of a rotor position signal of a phase in which said half period is counted, wherein said T/2 elapsed point in time is determined to be a switching point between said square wave on-control timings of two phases different from the phase in which said half period is counted or to be a switching point between the pulse width converted square wave PWM control timings of two phases different from the phase in which said half period is counted.

5. A brushless motor drive circuit as set forth in claim 4, wherein the timing width of each of said square wave on-control portion and said pulse width converted square wave PWM control portion is 2T/3.

6. A brushless motor drive circuit as set forth in claim 4, wherein the timing width of said pulse width converted sinusoidal wave PWM control portion is smaller than T/6.

7. A brushless motor drive circuit as set forth in claim 6, wherein the timing width of said pulse width converted sinusoidal wave PWM control portion is determined based on the value T.

8. A brushless motor drive circuit as set forth in claim 7, wherein the timing width of said pulse width converted sinusoidal wave PWM control portion is a value obtained by dividing T by a multiple of 2.

9. A brushless motor drive circuit as set forth in claim 8, wherein the timing width of said pulse width converted sinusoidal wave PWM control portion is T/8.

10. A brushless motor drive circuit as set forth in claim 9, wherein, after obtaining T/2, T/4 and T/8 by an operation from T and obtaining (T/4+T/8) and (T/2+T/8) by an operation, a time period having a width of T/8 from a T/2 elapsed time to a (T/2+T/8) elapsed time from an edge immediately after the count end of said rotor position signal, and a time period having a width of T/8 from a (T/4+T/8) elapsed time to a T/2 elapsed time are determined to be the timing widths of said pulse width converted sinusoidal wave PWM control portions for other two phases different from the phase in which said rotor position signal is counted.

11. A brushless motor drive circuit as set forth in claim 10, wherein, after obtaining T/64 by an operation from T and producing 8 shift signals which are sequentially shifted by T/64 in the timing width T/8 of said pulse width converted sinusoidal wave PWM control, a step voltage is obtained by dividing a voltage for pulse width modulation into 8 divided voltages by using voltage dividing ratios determined based on a sinusoidal function and by sequentially selecting a divided voltage from said 8 divided voltages by using said shift signals, and said pulse width converted sinusoidal wave PWM signal is obtained by pulse width modulating said step voltage by using a triangular wave voltage.

12. A brushless motor drive circuit as set forth in claim 11, wherein, said voltage for pulse width modulation, which is used for producing the pulse width converted sinusoidal wave PWM signals for performing the pulse width converted sinusoidal wave PWM control before and after the pulse width converted square wave PWM control, is also used for producing the pulse width converted square wave PWM signals for performing the pulse width converted square wave PWM control and is a voltage for performing pulse width modulation which varies depending on the rotation speed control signal, and wherein said voltage for pulse width modulation, which is used for producing the pulse width converted sinusoidal wave PWM signals for performing the pulse width converted sinusoidal wave PWM control before and after the square wave on-control, is the maximum value of a voltage for performing pulse width modulation which varies depending on said rotation speed control signal.

13. A brushless motor drive circuit for driving a brushless motor which has a rotor and exciting coils of three phases, said brushless motor drive circuit comprising:

a bridge output circuit which includes switching elements for current conduction timing control and switching elements for current quantity control and which performs excitation control by sequentially exciting said exciting coils every two phases;

a detector circuit which detects an induced voltage generated across said exciting coil of each phase;

a rotor position signal generating circuit which produces a square wave rotor position signal for said exciting coil of each phase, a half period of said rotor position signal corresponding to a time period from a polarity inversion of said induced voltage to the next polarity inversion of said induced voltage;

a control circuit which, based on said rotor position signal, performs excitation control of said exciting coils by square wave on-controlling said switching elements for current conduction timing control and by pulse width converted square wave pulse width modulation (PWM) controlling said switching elements for current quantity control;

a timing signal/shift signal generating circuit which generates timing signals and shift signals; and a pulse width converted sinusoidal wave PWM signal generating circuit which generates a pulse width converted sinusoidal wave PWM signal whose pulse width varies according to a sinusoidal function;

wherein excitation of said exciting coils is controlled based on said pulse width converted sinusoidal wave PWM signal immediately before and after said square wave on-control portion and/or said pulse width converted square wave PWM control portion.

14. A brushless motor drive circuit as set forth in claim 13, wherein said timing signal/shift signal generating circuit comprises a T-counter which counts a length of a half period of each of said rotor position signals and outputs the count value obtained by this count as T, a hold circuit which holds the count value T, and an operation circuit which operates the count value T held by the hold circuit, the value T outputted from the T-counter and the rotor position signal to produce timing signals and shift signals.

15. A brushless motor drive circuit as set forth in claim 14, wherein said operation circuit comprises:

a T/2 operation circuit, a T/4 operation circuit, a T/8 operation circuit and a T/64 operation circuit which, based on the value T held in said hold circuit, produce T/2 signal, T/4 signal, T/8 signal and T/64 signal, respectively;

a timing signal generating circuit which logically processes said T/2 signal, said T/4 signal, said T/8 signal, the T value from said T-counter and said rotor position signal to produce said timing signals; and a shift signal generating circuit which logically processes said T/64 signal and said timing signals to produce said shift signals.

16. A brushless motor drive circuit as set forth in claim 15, wherein said timing signal generating circuit produces a first timing signal which has an edge at a point after elapsing T/2, a second timing signal which has an edge at a point after elapsing (T/4+T/8), a third timing signal which has an edge at a point after elapsing (T/2+T/8), from an edge immediately after the count end of said rotor position signal.

17. A brushless motor drive circuit as set forth in claim 16, wherein said control circuit produces said pulse width converted sinusoidal wave PWM control timing portions which include a timing portion having a width of T/8 from an edge of said first timing signal to an edge of said third timing signal obtained by an exclusive OR logical operation between said first timing signal and said third timing signal, and a timing portion having a width of T/8 from an edge of said second timing signal to an edge of said first timing signal obtained by an exclusive OR logical operation between said first timing signal and said second timing signal.

18. A brushless motor drive circuit as set forth in claim 13, wherein said pulse width converted sinusoidal wave PWM signal generating circuit comprises:

a first step voltage generating circuit which receives said shift signals and the maximum value of a voltage for performing pulse width modulation that is used for producing the pulse width converted square wave PWM signals for performing the pulse width converted square wave PWM control and that varies depending on the rotation speed control signal, to produce a first step voltage;

a second step voltage generating circuit which receives said shift signals and said voltage for performing pulse width modulation that varies depending on the rotation speed control signal, to produce a second step voltage;

a first comparator which performs pulse width modulation of said first step voltage by using a triangular wave voltage and produces said pulse width converted sinusoidal wave PWM signals supplied to said switching elements for current conduction timing control; and a second comparator which performs pulse width modulation of said second step voltage by using a triangular wave voltage and produces said pulse width converted sinusoidal wave PWM signals supplied to said switching elements for current quantity control.

* * * * *